United States Patent
Hagström

(10) Patent No.: US 10,852,015 B2
(45) Date of Patent: Dec. 1, 2020

(54) CONTROLLED DILUTION FLOW IN CRITICAL ENVIRONMENTS

(71) Applicant: Halton Oy, Kausala (FI)

(72) Inventor: Kim Hagström, Lahti (FI)

(73) Assignee: HALTON OY, Kausala (FI)

(*) Notice: Subject to any disclaimer, the term of this patent is extended or adjusted under 35 U.S.C. 154(b) by 591 days.

(21) Appl. No.: 15/152,854

(22) Filed: May 12, 2016

(65) Prior Publication Data
US 2016/0334120 A1    Nov. 17, 2016

(30) Foreign Application Priority Data
May 12, 2015    (EP) .................................... 15167296

(51) Int. Cl.
*F24F 3/16*    (2006.01)
*F24F 13/10*    (2006.01)
(Continued)

(52) U.S. Cl.
CPC .............. *F24F 3/161* (2013.01); *F24F 11/72* (2018.01); *F24F 13/06* (2013.01); *F24F 13/10* (2013.01);
(Continued)

(58) Field of Classification Search
CPC .............. F24F 3/161; F24F 11/72; F24F 13/06
(Continued)

(56) References Cited

U.S. PATENT DOCUMENTS 2,640,412 A * 6/1953 Sweger .................... F24F 13/06
454/317
3,356,006 A * 12/1967 Scott .................... B01D 46/103
454/187
(Continued)

FOREIGN PATENT DOCUMENTS

CN    1129304 A    8/1996
CN    101784248 A    7/2010
(Continued)

OTHER PUBLICATIONS

Miura et al, JP 2011-226770 A English machine translation, Nov. 10, 2011.*
(Continued)

*Primary Examiner* — Edelmira Bosques
*Assistant Examiner* — Phillip Decker
(74) *Attorney, Agent, or Firm* — Robert P. Michal, Esq.; Carter, DeLuca & Farrell LLP

(57) ABSTRACT

A controlled dilution fluid flow pattern is described. In an embodiment, a fluid supply device is configured for controlling a pattern of a flow of a fluid within a critical room. The critical room comprises a critical area subject to contamination. A first fluid supply nozzle is configured to provide a first fluid supply jet to provide a first flow of the fluid towards a substantial center of the critical area. A second fluid nozzle is configured to provide a second fluid supply jet to provide a second flow of the fluid towards a perimeter of the room. A momentum of the first fluid supply jet and a momentum of the second fluid supply jet are
(Continued)

adjusted so that the substantial center of the critical area is flushed by the first flow and penetration of the second flow into the substantial center of the critical area is generally prevented. In other embodiments, a HVAC system and method are discussed along with the features of the device.

17 Claims, 7 Drawing Sheets

(51) Int. Cl.
    *F24F 13/26*     (2006.01)
    *F24F 13/06*     (2006.01)
    *F24F 11/72*     (2018.01)

(52) U.S. Cl.
    CPC ...... *F24F 13/26* (2013.01); *F24F 2013/0608* (2013.01); *F24F 2013/0612* (2013.01)

(58) Field of Classification Search
    USPC ......................................................... 454/187
    See application file for complete search history.

(56) References Cited

U.S. PATENT DOCUMENTS

| | | | | |
|---|---|---|---|---|
| 3,380,369 | A * | 4/1968 | Allander | A61G 13/108 128/205.26 |
| 3,687,054 | A * | 8/1972 | Boberg | B64D 13/00 454/76 |
| 3,699,871 | A | 10/1972 | Larkfeldt | |
| 3,721,067 | A * | 3/1973 | Agnew | A61G 13/108 128/897 |
| 3,776,121 | A * | 12/1973 | Truhan | F24F 3/044 454/187 |
| 4,055,112 | A * | 10/1977 | Larkfeldt | F24F 7/007 454/188 |
| 4,094,232 | A * | 6/1978 | Howorth | A61G 13/108 454/187 |
| 4,506,595 | A * | 3/1985 | Roberts | F24F 7/04 454/186 |
| 4,726,285 | A * | 2/1988 | Kelley | F24F 13/068 454/284 |
| 4,819,548 | A * | 4/1989 | Horstman | B64D 13/00 244/118.5 |
| 4,890,544 | A * | 1/1990 | Aalto | F24F 9/00 454/297 |
| 5,054,379 | A * | 10/1991 | Sodec | F24F 13/06 454/284 |
| 5,086,692 | A * | 2/1992 | Welch | F24F 3/161 454/187 |
| 5,167,577 | A * | 12/1992 | Kristensson | F24F 13/068 454/298 |
| 5,295,905 | A * | 3/1994 | Simble | F24F 13/065 454/286 |
| 5,876,281 | A * | 3/1999 | Hirasawa | F24F 3/161 454/305 |
| 6,048,499 | A * | 4/2000 | Hirayama | A61L 9/122 422/121 |
| 6,110,244 | A * | 8/2000 | Wood | F24F 3/1607 454/189 |
| 6,482,083 | B1 * | 11/2002 | Nilsson | A61G 10/02 454/187 |
| 7,597,617 | B2 * | 10/2009 | Solberg | F24F 13/068 454/187 |
| 8,308,536 | B2 * | 11/2012 | Kristensson | A61G 13/108 454/187 |
| 8,469,783 | B2 * | 6/2013 | Juslin | F24F 11/027 454/237 |
| 2008/0209870 | A1 | 9/2008 | Solberg et al. | |
| 2008/0242214 | A1 * | 10/2008 | Sung | F24F 13/06 454/284 |
| 2010/0120349 | A1 * | 5/2010 | Kristensson | A61G 13/108 454/187 |
| 2015/0241082 | A1 * | 8/2015 | Mosley | F24F 13/08 454/290 |
| 2016/0209065 | A1 * | 7/2016 | Hagstrom | A61G 13/108 |

FOREIGN PATENT DOCUMENTS

| | | | | |
|---|---|---|---|---|
| DE | 3025342 | | 1/1982 | |
| DE | 3208123 | A1 * | 3/1983 | ........... A61G 13/108 |
| DE | 102014221344 | A1 * | 4/2016 | ............. F24F 3/161 |
| EP | 0271652 | | 6/1988 | |
| EP | 2181686 | | 5/2010 | |
| GB | 2120778 | | 12/1983 | |
| JP | H04-008028 | U | 1/1992 | |
| JP | 3077659 | | 2/2001 | |
| JP | 2011-226770 | | 11/2011 | |
| JP | 2012-507321 | A | 3/2012 | |
| JP | 2013-148241 | | 8/2013 | |
| NL | 7102599 | | 8/1971 | |

OTHER PUBLICATIONS

ENIG Energieberatung Innovation GmbH, DE 3025342 A1 English machine translation, Jan. 28, 1982.*
Nordenadler, J. et al., "Något om skyddsventilation i operationsrum" Aug. 2010. (Abstract).
European Search Report issued in corresponding European Patent Application No. 15167296.1 dated Nov. 3, 2015. (8 pages).
Office Action issued by The State Intellecutal Property Office of China in relation to Chinese Application No. 201610319533.5 dated Jul. 31, 2018 (11 pages) along with English language translation (11 pages).
Office Action issued by the China National Intellectual Property Administration Office in relation to Chinese Application No. 201610319533.5 dated Oct. 25, 2019 ( 9 pages) along with English language translation (2 pages).
Chinese Office Action dated May 19, 2020, issued in Chinese Application No. 201610319533 (10 pages) along with English language translation (13 pages).
Japanese Office Action dated Jun. 17, 2020, issued by the Japanese Patent Office (JPO) in Japanese Application No. 2016-096355, 4 pages along with English translation (6 pages).

* cited by examiner

CONTROLLED DILUTION FLOW IN CRITICAL ENVIRONMENTS

TECHNICAL FIELD

The present invention relates to HVAC. In particular, the present invention relates to control of a fluid flow pattern within a critical room.

BACKGROUND

HVAC, heating, ventilating, and air conditioning, is a technology for indoor environmental comfort. Its goal is to provide thermal comfort and acceptable indoor air quality. HVAC system design is a sub-discipline of mechanical engineering, based on the principles of thermodynamics, fluid mechanics, and heat transfer. Refrigeration is sometimes added to the abbreviation as HVAC&R or HVACR, or ventilating is dropped out as in HACR (such as in the designation of HACR-rated circuit breakers). HVAC is important in indoor design where safe and healthy building conditions are regulated with respect to temperature and humidity, using fresh air from outdoors.

Ventilating (the V in HVAC) is the process of changing or replacing air in any space to provide high indoor air quality, for example to control temperature, replenish oxygen, or remove moisture, odors, smoke, heat, dust, airborne bacteria, and carbon dioxide. Ventilation is used to remove unpleasant smells and excessive moisture, introduce outside air, to keep interior building air circulating, and to prevent stagnation of the interior air. Ventilation includes both the exchange of air to the outside as well as circulation of air within the building. It is one of the most important factors for maintaining acceptable indoor air quality in buildings. Methods for ventilating a building may be divided into mechanical or forced and natural types.

PRIOR ART

The current applications of air distribution principles for critical environments are based on a simplified thinking of a zoning principle to be used in most critical (EN standard cleanrooms) environments and a dilution principle to be used in other rooms. In many cases, this thinking has led in practice to an unsatisfactory realization of the airflow pattern within the critical rooms. In particular in operating rooms where invasive methods are used to treat patients, the presence of operational personnel as a contaminant source in the proximity of the patient causes special challenges in the prevention of wound contamination. The recent (Nordenadler et al) research conducted during ongoing surgery has shown that zonal systems, the most common realization of which is a low turbulent flow ceiling supply, in which the air is supplied from a large surface over the operation area, fail to provide the desired zoning but result in mixed conditions within the room with a reverse flow into the critical zone.

On the other hand, mixing solutions that are currently used in operating rooms are not based on a throughout thinking, and they can fail to provide truly mixed conditions and certainly lack the prevention of the reverse flow into the most critical areas as well as the ability to control the thermal environment and velocity conditions for occupation. One of the common methods is based on the usage of swirl diffusers in the ceiling, typically located symmetrically within the room. This system has both a risk of allowing contaminated air to enter the wound area from the floor level and no means to control the velocity conditions. A second very common method used in the past is a high wall or ceiling/wall corner supply, which is very sensible to the temperature difference between the supply and the room air. Depending on the operational conditions, it may blow the air past the operating personnel prior to entering the wound area or blow the air directly to the floor, thus bringing all the settled contaminants into the operational area. A third very common system is a parallel flow system, in which the air is supplied into the operating area from two elongated air supply devices that are parallel to the operating theater. Compared to the previously mentioned systems, this system has the advantage of providing air supply to the center of the critical zone. However, the design of such a system is based on the avoidance of excessive velocity within the center without the possibility to adjust the jet or velocity. The design is based only on the distance of the air supply device from the center. Thus, the air supply jet or the jet velocity is not adjustable. The reverse flow from the periphery poses a risk in many critical rooms.

Common to all currently used mixing type systems is that they are not capable of providing a sufficient airflow rate for the necessary dilution in a controlled manner.

SUMMARY

An object of the present invention is to provide a controlled dilution fluid flow pattern. The object is achieved by the features of the independent claims.

A controlled dilution fluid flow pattern is described. In an embodiment, a fluid supply device is configured for controlling a pattern of a flow of a fluid within a critical room. The critical room comprises a critical area subject to contamination. A first fluid supply nozzle is configured to provide a first fluid supply jet to provide a first flow of the fluid towards a substantial center of the critical area. A second fluid nozzle is configured to provide a second fluid supply jet to provide a second flow of the fluid towards a perimeter of the room. A momentum of the first fluid supply jet and a momentum of the second supply fluid jet are adjusted so that the substantial center of the critical area is flushed by the first flow and penetration of the second flow into the substantial center of the critical area is generally prevented.

In other embodiments, a HVAC system and method are discussed along with the features of the device.

The afore-mentioned implementation embodiment offers a solution to the problems and disadvantages of the known prior art. Other technological benefits of the present invention become evident to a person skilled in the art from the following description and the claims. The numerous embodiments of implementing the present invention achieve only a part of the presented advantages. None of the advantages is critical to the embodiments of implementation. Any required embodiment can technically be combined with any other required embodiment. The embodiments represent only a few advantageous embodiments and they do not limit the idea of the invention that can also be implemented in other manners within the framework of the claims presented further below.

BRIEF DESCRIPTION OF THE DRAWINGS

The attached figures illustrate examples of embodiments of the present invention, and together with the above general description and the detailed current embodiments help to explain, by way of examples, the principles of the invention.

DETAILED DESCRIPTION

According to an embodiment, a layout and setting of air supply devices within a critical room is described to produce more consistent cleanliness and thermal environment within the critical room where critical operations are practiced.

According to some embodiments, a system, a method and an air supply device with settings for controlling at least one indoor environmental condition of a room are provided, comprising: At least one air supply device, or a system of multiple air supply devices, which are configured to provide a (one) combined controlled airflow field within the critical room that may provide substantially uniform cleanness of the indoor environmental conditions in the entire room. They may transport part of the contaminants out of the critical zone within the center of the room by a jet momentum. They may prevent backflow of the contaminants into the critical zone from the periphery by a jet momentum adjustment. They may provide the desired air velocity conditions for both contaminant control and thermal comfort for the people in the space. The specific setting of the air supply devices is according to an embodiment a function of both the air supply device and the critical room layout. Consequently, a controlled airflow pattern can be created by a specific setting with a different layout.

An embodiment may be firstly based on the selection of a jet momentum of the first air jet and air velocity that the air supply device provides into the center of the room to overcome other momentum sources within the room, such as heat currents and personnel movement. Secondly, it may be based on the selection of the jet momentum of the second air jet directed into the room perimeter in such a manner that the momentum of the jet directed into the middle of the room is able to prevent the penetration of the backflow of the perimeter jet into the critical zone in the center of the room. Thirdly, it may be based on the supplying of the remaining air supply, a third air jet, between the first and the second air jet in such a manner that it does not generally disturb the total room air flow pattern generated primarily by the first and second air jets.

An embodiment of the air supply device, which may for example be used in the example of the method, has configurable guiding paddles to adjust the jet formed by the first, second and third air jets and the share of the air supply flow supplied by the first, second or third jet. Additionally, the adjustment allows to fine tune the air flow pattern to the specifics of the space and its usage—for example in a hybrid type operating room with uneven heat sources. In an embodiment, the air supply device has a ring form around the center of the critical room, consequently providing a three-dimensional flow for a more complete dilution.

Figure 1:
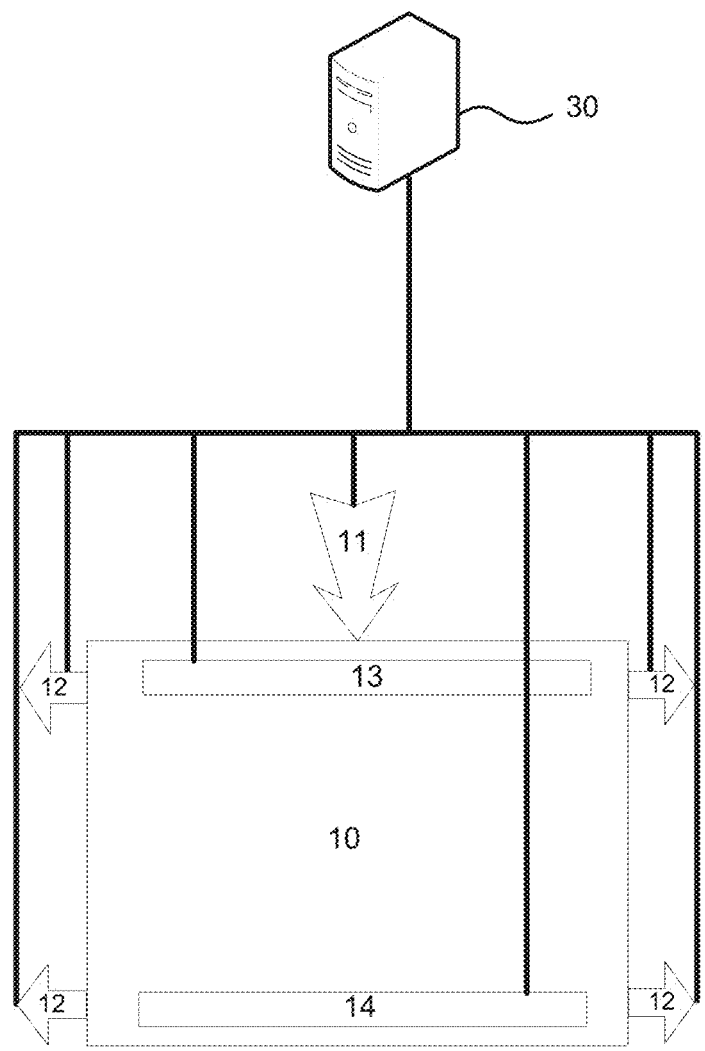
FIG. 1 illustrates an example of a system for supplying fluid to a critical room in accordance with an embodiment.

In the embodiment, a ring-formed air supply device arrangement is located in the ceiling of a room 10 is shown. For example, the room 10 as illustrated by the embodiment of FIG. 1 may be a clean room, which involves an operation subject to contamination. An example of a clean room may be an operation room, OR, for a medical operation. Other examples of the room 10 may be rooms indoors where the level of cleanness of the indoor environmental conditions of the room 10 is controlled, for example rooms within a hospital. Pharmacy interiors, manufacturing or processing spaces may be other examples. Electronics or fine mechanics manufacturing or processing rooms may be other kinds of examples. Biological or microbiological manufacturing or processing spaces may be other examples. The room comprises HVAC devices 11,12,13,14 configured to control the indoor environmental condition of the room 10 as shown in the embodiment of FIG. 1. An input ventilation device 11 and an output ventilation device 12 are configured to control the ventilation of the room. An apparatus 30 is configured to control the ventilation devices 11,12 in terms of the level of the cleanness of the room 10. Furthermore, the ventilation devices 11,12 may be configured to detect the level of cleanness of the room 10. For example, the amount of impurities, particles, gasses, etc. may be controlled or detected from the air of the room 10. Thus, the ventilation devices 11,12 are configured to control a level of cleanness of the indoor environmental condition of the room 10. The level of cleanness may partly be based on the amount of ventilation of the room 10. The level of cleanness may partly be based on the amount of ventilation of the room 10, the amount of air entering the room, the amount of air leaving the room. The air entering the room 10 may be made hygienic. The room further comprises a heating device 14 and a cooling device 13 which both are also configured to control the indoor environmental conditions. The HVAC devices 11,12,13,14 are coupled with a computing apparatus 30 configured to control the indoor environmental conditions of the room 10. The computing apparatus 30 may control each HVAC device 11,12,13,14 individually. For example, excess pressure may be created into the room 10 by inputting more air with the input ventilation device 11 than the air exiting the room from the output ventilation device 12. As another example, an underpressure may be created in the room 10 by outputting more air by the output ventilation device 12 than the input of the input ventilation device 11.

While the HVAC device provides the right amount of fresh and clean air, heating and cooling, the room air diffusion and air flow pattern plays a role on the cleanness within the space of the room 10. It may dictate whether cleanness is reached in the whole room space or whether there will be gradients in contaminant concentrations. In the case of the zoning principle, these gradients may be wanted, but in the case of dilution, the areas of higher contaminant concentration may be undesired failures.

Figure 2:
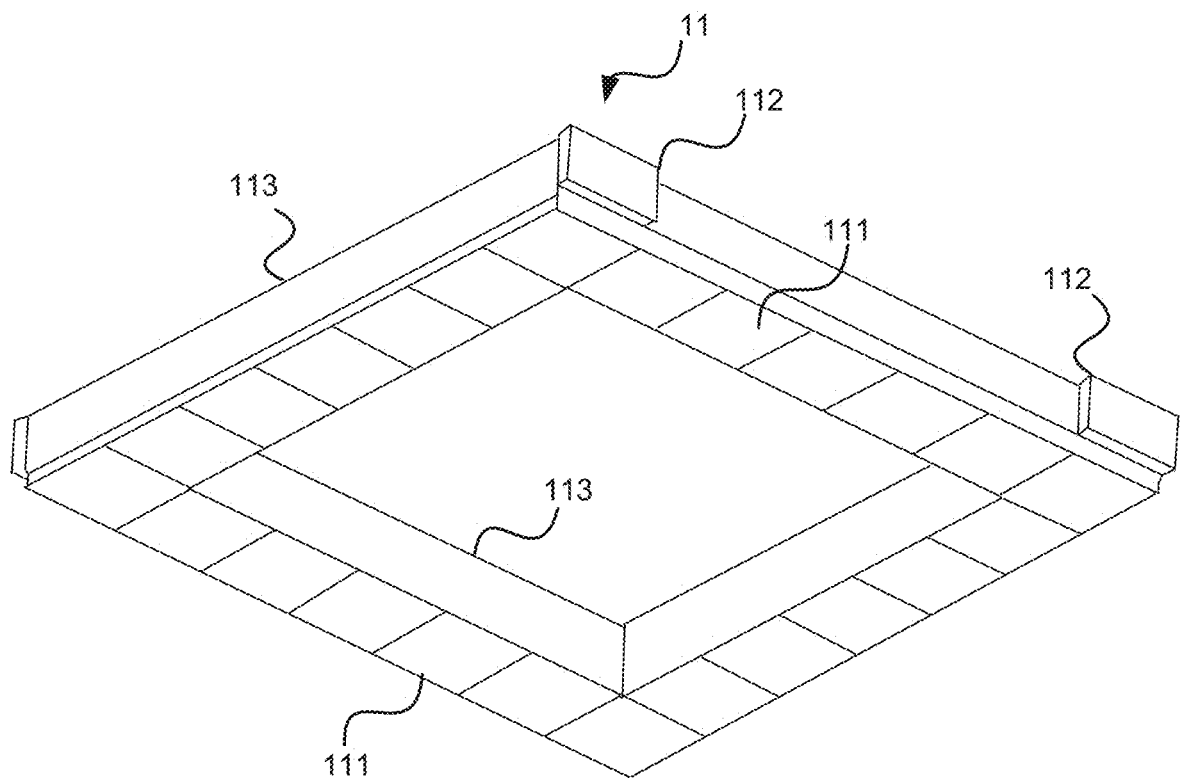
FIG. 2 illustrates an example of a schematic illustration of a rectangular ring shaped air supply device for three dimensional controlled dilution in accordance with an embodiment.

FIG. 2 illustrates an embodiment of an input ventilation device 11. The input ventilation device 11 may also be referred to as an air supply device. The embodiment of FIG. 2 illustrates a ring type air supply device 11 which is an example of a more optimal form to create the controlled dilution airflow pattern that ventilates evenly the whole room space. The ring type air supply device 11 can have a square form as it is shown in FIG. 1. However, it should be noted that it can also have different ring type shapes with alternating length and width to accommodate the air supply device 11 and the air flow pattern to the actual room 10 dimensions. For example, the ring form can also be round-shaped such as a circle or circular-shaped air supply device 11.

In the embodiment of FIG. 2, the air supply device 11 includes a plurality of front panels 111, a body 113, and an air supply input 112. The front panels 111 are configured to supply and direct the air jet entering the room 10. The input 112 can be connected to a ventilation duct receiving the air input for example for an input air pump device.

Figure 3:
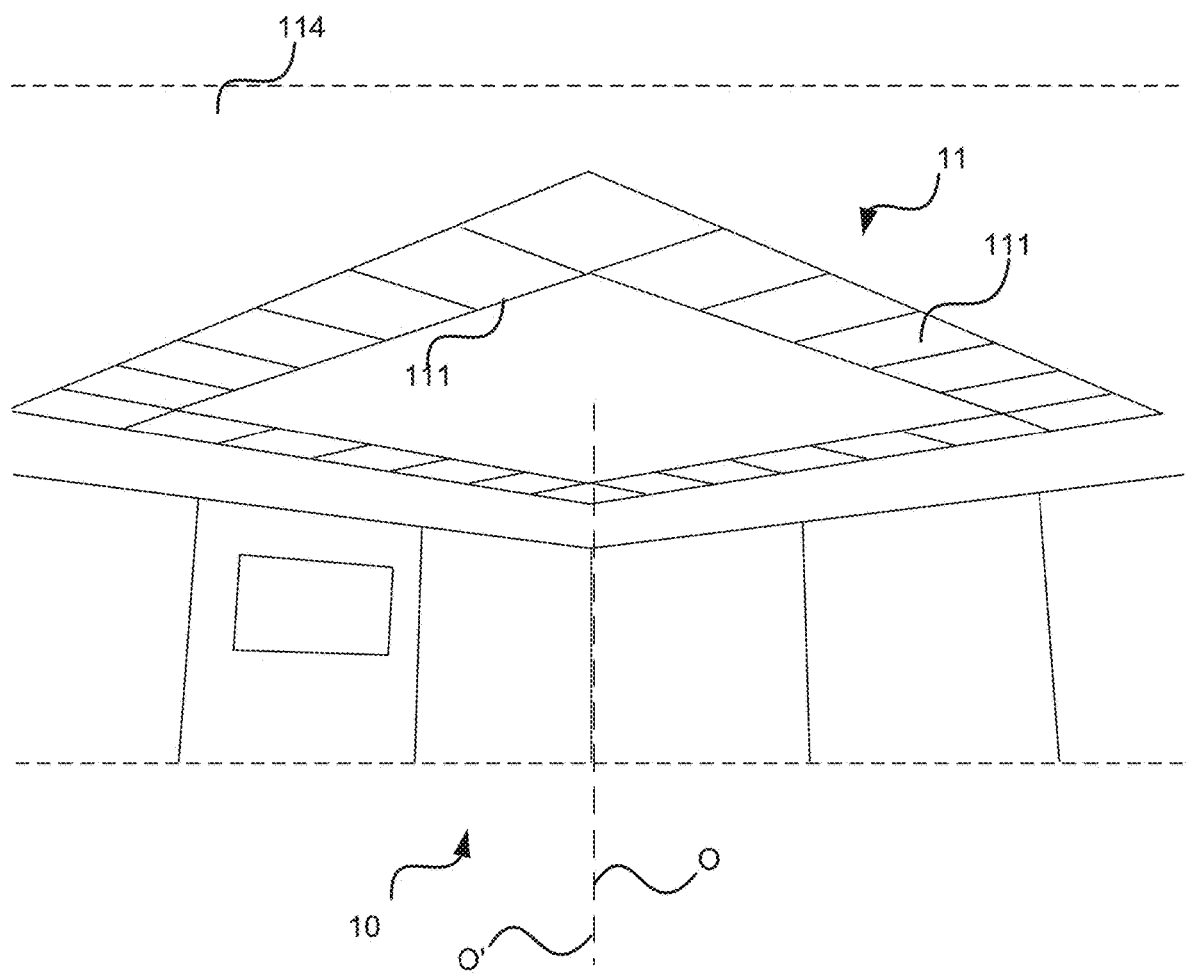
FIG. 3 illustrates an example of a schematic illustration of a rectangular ring shaped air supply diffuser positioned centrally within the ceiling of a critical room in accordance with an embodiment.

FIG. 3 illustrates an embodiment of a ring type air supply device 11 located in a ventilated room 10. The air supply device 11 is located at the ceiling 114 of the room 10. For example, the air supply device 11 may be integrated in the ceiling 114. In the embodiment of FIG. 3, the air supply device 11 is centrally located in the room 10, which is an example of a location if the center O of the critical area for the operations may be at the center O of the room 10. The device 11 can also be located differently within the room 10. For example, if the center O' of the critical area is not at the center O of the device 11, the air supply device 11 can be oriented with respect to the critical area. For example, the center O of the air supply device 11 may be oriented with respect to the center O' of the critical area. It should be also noted that the center O and/or the center O' may or may not be the physical center point of the room 10.

Figure 4:
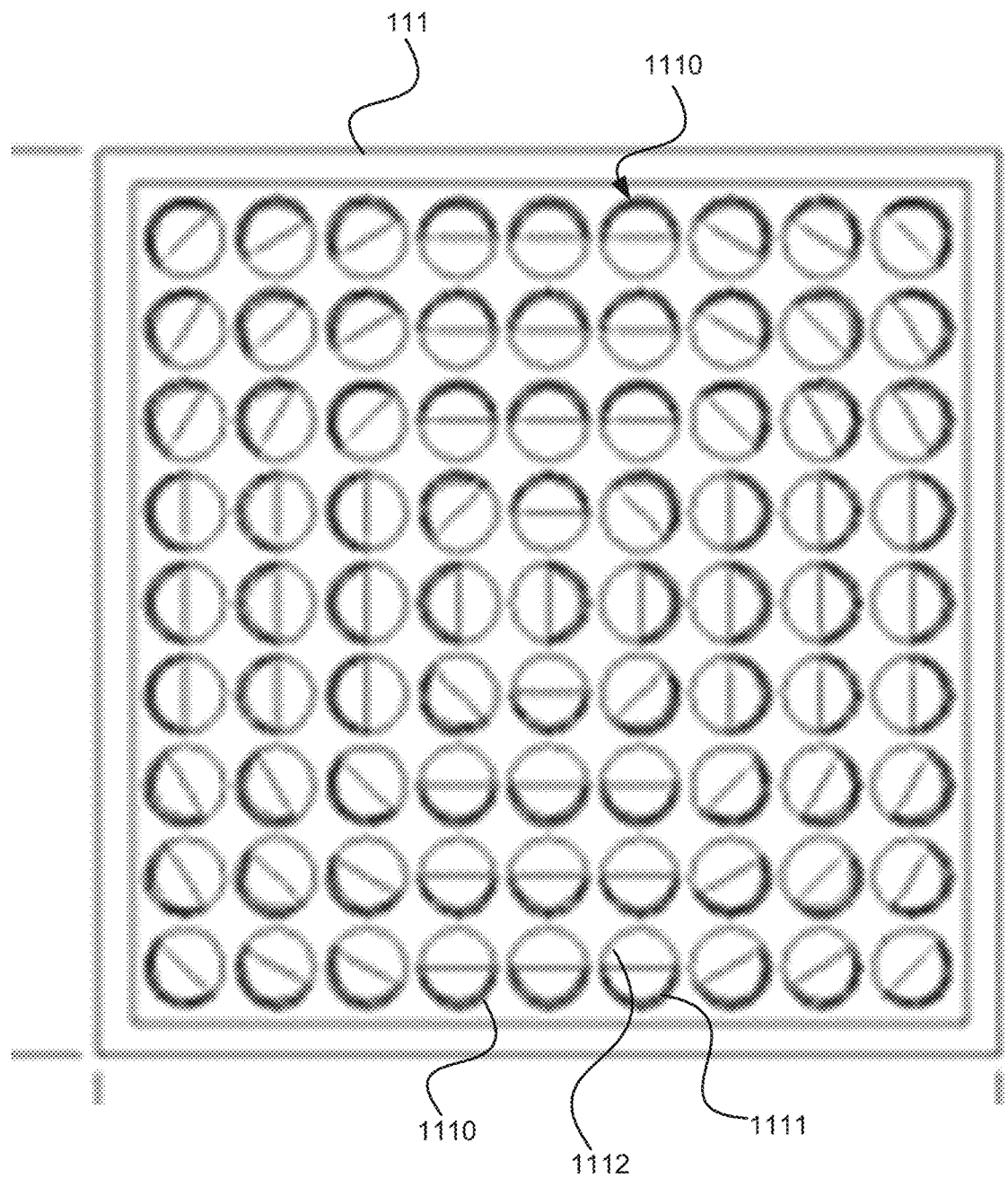
FIG. 4 is an example of a section of a face of an air supply device with multiple nozzles in accordance with an embodiment.

FIG. 4 illustrates an embodiment of a section of a front panel 111 of the air supply device 11. FIG. 4 illustrates one possible application to be used in the controlled dilution device, method and system. The front panel 111 includes multiple adjustable nozzles 1110 which enable a flexible throw pattern adjustment of the air supply. The nozzles 1110 include an opening 1111 for supplying the air and a guiding leaf 1112 for directing a jet of the supplied air. The front panel 111 can be built in different ways, and only one example is illustrated in FIG. 4 having nozzles 1110. For example, the same result could be accomplished with a front panel 111 with adjustable slotted openings. As another example, the nozzles 1110 may be directed in various ways for achieving the desired flow of air and jet direction. Also, the nozzles 1110 may be of a different size and shape. The example of FIG. 4 shows a plurality of circular nozzles. As another example, square of rectangular nozzles may be used. As another example, only a single nozzle may be provided with dividing guiding leafs so as to establish the first, the second and the third jets 20,21,22.

Figure 5:
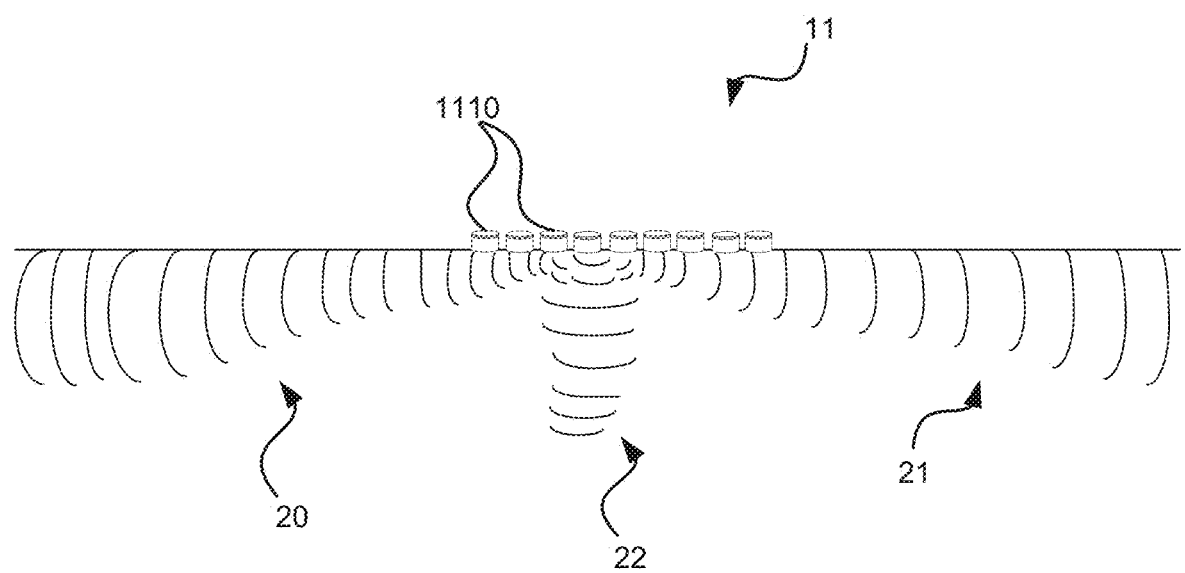
FIG. 5 is an embodiment of a schematic illustration of a cross section of the air supply flow pattern with first, second and third air jets.

FIG. 5 illustrates a schematic cross section of air supply flow patterns from the air supply device 11 with a first air jet 20, a second air jet 21 and a third air jet 22. The first jet 21 is directed towards the center O of the ring type air supply device 11. The second jet 21 is directed to the room 10 perimeter, out from the center O of the air supply device 11. The third jet 22 is supplied between the first jet 20 and the second jet 21 in such a way that it for example has less interference on the primary airflow pattern within the room created by those two jets 20,21, but the air from the third jet 22 is induced as secondary air into the first air jet 20 and the second air jet 21. The design and shape of the front panel 111 may influence the jets 20,21,22. For example, how the opening 1111 and the guiding leaf 1112 are configured and designed may influence the direction of the jets.

Figure 6:
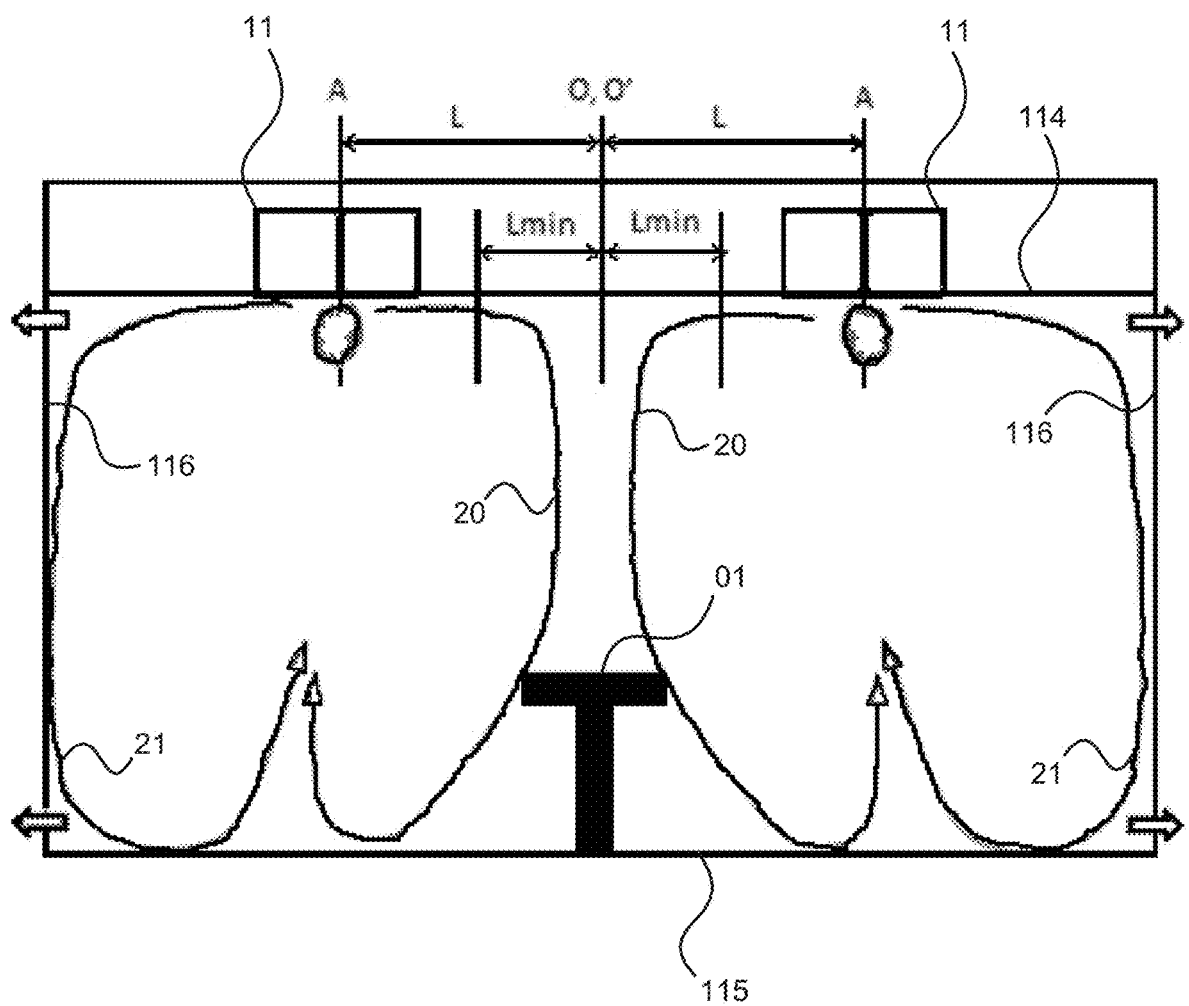
FIG. 6 is an example of a schematic illustration of the controlled dilution air flow pattern in a critical room in accordance with an embodiment.

FIG. 6 is showing a cross section of an airflow pattern of the room 10. FIG. 6 illustrates a cross section view of the room 10 with a cross section of a ring shaped air supply device 11. The air supply flow, which is created by the first jet 20, is directed along the ceiling 114 towards the center O of the ring shaped air supply device 11. It is merging from all four directions in the x,y coordination level into the center O of the ring type air supply device 11. The merged jet is directed downwards from the ceiling 114 after merging. Once the merged jet reaches a critical surface 01 in the center of the critical area, O', it is pushing the air away from the center O,O'. The air flow pattern circulates down to the level of the floor 115 prior to returning to the proximity of the first air supply jet 20, where it is re-induced by the first jet 20. The momentum of the first air supply jet 20 is selected to provide a sufficient impulse at the center O' of the critical area to displace the contaminants out of the critical area, taking into account the other momentum sources, such as plumes from the heat sources, the persons' movement, or local air jets, generated within the area of concern. Additionally, the air velocity and thermal comfort conditions are adjusted by controlling the momentum of the first air supply jet 20. FIG. 6 illustrates an embodiment of the air flow pattern within the critical room, it should be noted that there may be minor or different air flow patterns within the room 10, even if the general flow of air is based on the embodiment of FIG. 6. For example, the air flow may be divided or shattered, when it collides with the critical surface 01 so that a portion of it is directed more toward the supply 11 than towards the floor 115 and another portion is directed more towards the floor 115 than to the supply 11.

FIG. 6 also illustrates the second air supply jet 21 that is directed from the device 11 out of the center O of the ring shaped air supply device 11. It flows along the ceiling 114 towards the perimeters of the room 10 and turns at the ceiling-wall corner downwards along the wall 116 and further turns at the wall-floor corner towards the center O of the ring air supply device 11 along the floor 115. The momentum of the second air supply jet 21 is selected both to provide a steady airflow pattern that flushes the entire perimeter area of the room 10 and to prevent the penetration of the second air supply jet 21 flow into the critical area inside the perimeter of the ring air supply device 11. Thus, the momentum balance between the first air supply jet 20 and the second air supply jet 21 is selected in such a way that the momentum of the first air jet 20 and the momentum of the second air jet 21 are equal at a safe distance L from the center O,O' and the merged reverse flow of the first jet 20 and the second jet 21 is turned from the floor 115 level towards the air supply device 11. According to an embodiment, a horizontal distance L from the center O,O' may extend to the center A of the perimeter of the ring duct of the device 11. According to an embodiment, the minimum distance Lmin of the distance L may be at least 1 meter. However, the minimum distance Lmin may be dependent on the momentum of the jets, etc.

A complete ring air supply device, as shown in the FIG. 2, may be an example to reach the controlled dilution airflow pattern within a room 10. Another example may, however, be applied with slightly impaired results, but still reaching a more controlled environment than the solutions presented in the prior art, as described in the following embodiments:

According to an embodiment, the ideal design condition may be that the center of the critical area, O', and the center of the air supply ring, O, are at the same point. According to another embodiment, the center of the ring, O, may differ from the center of the critical area, O'. In this embodiment, the first air supply jet 20 may be adjusted to have a different setting of the first jet 20, second jet 21 and third jet 22 for different sections of the ring shaped air supply device 11. For example, certain sections may have emphasized flow of air, while other sections have less flow. They are adjusted so that the momentum of the first fluid supply jet 20 and a momentum of the second fluid supply jet 21 are adjusted so that the substantial center O' of the critical area is flushed by the first flow 20 and penetration of the second flow 21 into the substantial center O' of the critical area is generally prevented.

The ring shaped air supply device 11 may be implemented with an incomplete ring shaped air supply, for example with four or more independent diffusers located around the center, O, of the ring, providing the air supply flow pattern with a first air jet 20, a second air jet 21 and a third air jet 22 as described in the embodiment of FIG. 5. These air supply devices can be located flush with the ceiling 114, below the ceiling 114 or even at the wall 116 close to the ceiling 114.

Figure 7:
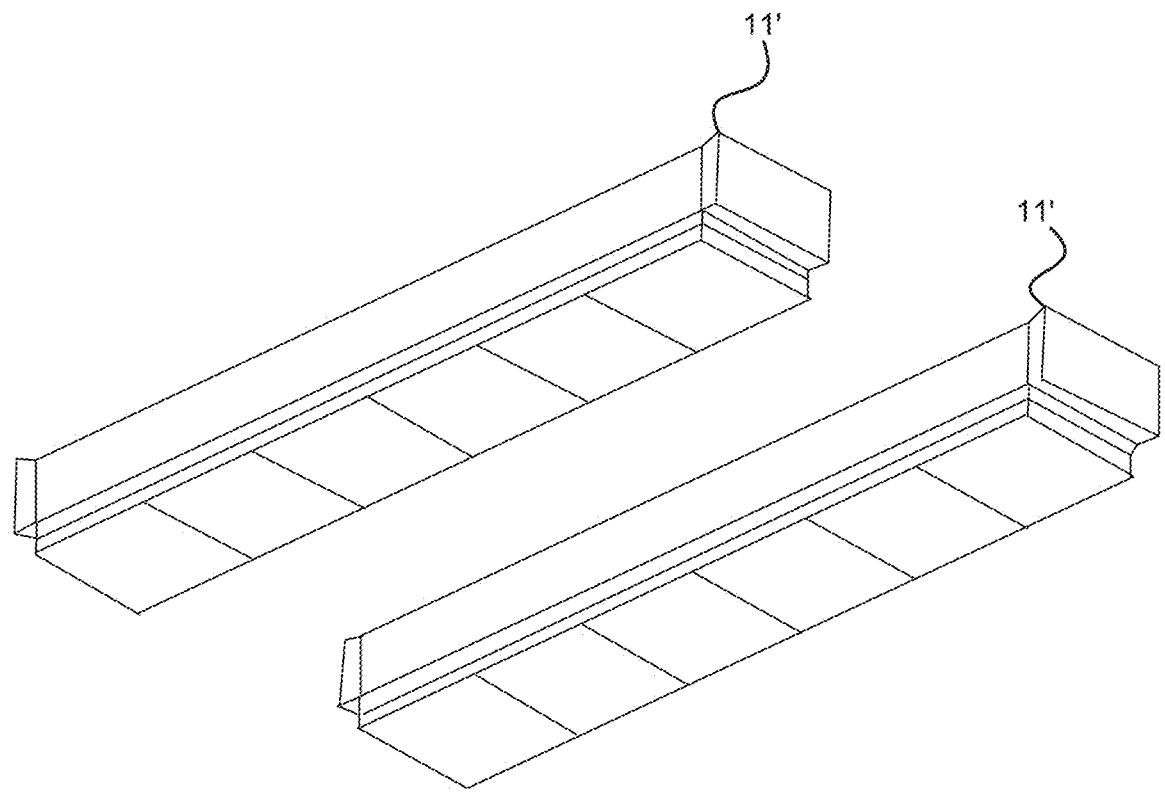
FIG. 7 is an example of a system of two elongated air supply devices with air jet adjustment facility providing two-dimensional controlled dilution in accordance with an embodiment.

FIG. 7 illustrates an embodiment of a two dimensional room airflow pattern with two elongated air supply devices 11' providing the air supply flow pattern with first 20, second 21 and third 22 jets as described in FIG. 5. These air supply devices 11' can be located flush with the ceiling 114, below the ceiling 114 or even at the wall 116 close to the ceiling 114.

As the momentum balance of the embodiments has been adjusted, the system according to an embodiment can be operated both in a heating and cooling mode as well as in a reduced or a boost airflow mode without a substantial risk of losing the controlled dilution flow pattern within the ventilated room 10.

For a person skilled in the art, it is obvious that numerous modifications and variations can be made to the equipment and the method. Other embodiments and exemplary implementations become evident to a person skilled in the art on the basis of the specification and practice related to the equipment and the method described. The purpose is that the specification and the embodiments be regarded only as exemplary, so that the following patent claims and their equivalents show the actual scope of protection.

The invention claimed is:

1. A fluid supply device configured for controlling a pattern of a flow to a fluid within a clean room, wherein the clean room comprises a clean area subject to contamination, comprising:
    a front panel including multiple adjustable nozzles which enable a flexible throw pattern adjustment of an air supply, wherein the multiple adjustable nozzles are each spaced from all vertical walls of the clean room and include:
        a first fluid supply nozzle configured to provide a first fluid supply jet to provide a first flow of the fluid towards a center of the clean area;
        another first fluid supply nozzle configured to provide another first fluid supply jet to provide another first flow of the fluid towards a center of the clean area, wherein the first fluid supply jet and the another first fluid supply jet are directed along a ceiling of the clean room and towards one another; and
        a second fluid nozzle configured to provide a second fluid supply jet to provide a second flow of the fluid towards a perimeter of the room, the second fluid supply jet directed along the ceiling of the clean room;
    wherein a momentum of the first fluid supply jet and a momentum of the second fluid supply jet are adjusted so that the center of the clean area is flushed by the first flow and penetration of the second flow into the center of the clean area is prevented,
    wherein the vertical walls include first and second vertical walls in opposing relation to one another, and third and fourth vertical walls in opposing relation to one another,
    wherein the first fluid supply nozzle is configured to provide the first fluid supply jet to provide the first flow of the fluid in a direction away from the first wall and toward the second wall, and the another first fluid supply nozzle is configured to provide the another first fluid supply jet to provide the another first flow of the fluid in a direction away from the second wall and toward the first wall such that the first flow and the another first flow collide at the center of the room,
    wherein the second fluid supply nozzle is configured to provide the second fluid supply jet to provide the second flow of the fluid in an opposite direction of the first flow and toward the first wall to collide with the first wall such that the first and second flows collide with one another adjacent a floor of the clean room and at a position directly underneath the first and second fluid supply nozzles,
    wherein the multiple adjustable nozzles include another second fluid nozzle configured to provide another second fluid supply jet to provide another second flow of the fluid in an opposite direction of the another first flow and toward the second wall to collide with the second wall such that the another first and second flows collide with one another adjacent the floor and at a position directly underneath the another first and second fluid supply nozzles,
    wherein the front panel includes:
        a first plurality of front panels arranged in a linear array, the first plurality of front panels disposed adjacent and spaced from the first wall; and
        a second plurality of front panels arranged in a linear array, the second plurality of front panels disposed adjacent and spaced from the second wall, wherein each front panel of the first plurality of front panels and the second plurality of front panels has the multiple adjustable nozzles.

2. The fluid supply device of claim 1, wherein the fluid supply device is configured in a circumferential form circumventing the center.

3. The fluid supply device of claim 1, wherein the first flow and the second flow are configured to have an opposite direction at a location of the first and second fluid supply nozzles.

4. The fluid supply device of claim 1, wherein the first fluid supply nozzle is configured to a first section unit of the device and the another first fluid supply nozzle is configured to a second section unit of the device.

5. The fluid supply device of claim 4, wherein the ceiling of the clean room and the collision between the first flow and the another first flow direct the first and the another first flow towards the floor of the clean room.

6. The fluid supply device of claim 5, wherein an operation area of the clean room and the collision between the first flow and the another first flow are configured to direct the first and the another first flow towards the perimeter.

7. The fluid supply device of claim 1, wherein the first vertical wall and the ceiling of the room are configured to direct the second flow towards the floor of the room, and the first vertical wall and the floor are configured to direct the second flow towards the center, and the collision between the first and second flows is configured to re-direct the second flow away from the clean area.

8. The fluid supply device of claim 1, wherein the fluid comprises air.

9. The fluid supply device of claim 1, wherein each of the multiple adjustable nozzles has an opening and a paddle configured to direct the flow of the fluid.

10. The fluid supply device of claim 1, further comprising a third fluid supply jet which is configured between the first jet and the second jet.

11. The fluid supply device of claim 10, wherein the third fluid jet is introduced in such a manner that it does not significantly change an airflow pattern created by the first jet and the second jet.

12. The fluid supply device of claim 1, wherein the device is configured in the ceiling of the clean room or at the ceiling of the clean room.

13. The fluid device according to claim 1, wherein the first plurality of front panels and the second plurality of front panels are disposed on opposite sides of the center of the room, wherein the first plurality of front panels and the second plurality of front panels are spaced the same horizontal distance from the center of the room, and wherein the first plurality of front panels are parallel with the first wall, and the second plurality of front panels are parallel with the second wall.

14. An HVAC system comprising:
a fluid supply device configured for controlling a pattern of a flow to a fluid within a clean room, wherein the clean room comprises a clean area subject to contamination, the fluid supply device comprising:
a front panel including multiple adjustable nozzles which enable a flexible throw pattern adjustment of an air supply, wherein the multiple adjustable nozzles are each spaced from all vertical walls of the clean room and include:
a first fluid supply nozzle is configured to provide a first fluid supply jet to provide a first flow of the fluid towards a center of the clean area;
another first fluid supply nozzle is configured to provide another first fluid supply jet to provide another first flow of the fluid towards a center of the clean area, wherein the first fluid supply jet and the another first fluid supply jet are directed along a ceiling of the clean room and towards one another; and
a second fluid nozzle configured to provide a second fluid supply jet to provide a second flow of the fluid towards a perimeter of the room, the second fluid supply jet directed along the ceiling of the clean room;
wherein a momentum of the first fluid supply jet and a momentum of the second fluid supply jet are adjusted so that the center of the clean area is flushed by the first flow and penetration of the second flow into the center of the clean area is prevented,
wherein the HVAC system is configured to control heating, ventilation and air conditioning of the clean room
wherein the vertical walls include first and second vertical walls in opposing relation to one another, and third and fourth vertical walls in opposing relation to one another,
wherein the first fluid supply nozzle is configured to provide the first fluid supply jet to provide the first flow of the fluid in a direction away from the first wall and toward the second wall, and the another first fluid supply nozzle is configured to provide the another first fluid supply jet to provide the another first flow of the fluid in a direction away from the second wall and toward the first wall such that the first flow and the another first flow collide at the center of the room,
wherein the second fluid supply nozzle is configured to provide the second fluid supply jet to provide the second flow of the fluid in an opposite direction of the first flow and toward the first wall to collide with the first wall such that the first and second flows collide with one another adjacent a floor of the clean room and at a position directly underneath the first and second fluid supply nozzles,
wherein the multiple adjustable nozzles include another second fluid nozzle configured to provide another second fluid supply jet to provide another second flow of the fluid in an opposite direction of the another first flow and toward the second wall to collide with the second wall such that the another first and second flows collide with one another adjacent the floor and at a position directly underneath the another first and second fluid supply nozzles,
wherein the front panel includes:
a first plurality of front panels arranged in a linear array, the first plurality of front panels disposed adjacent and spaced from the first wall; and
a second plurality of front panels arranged in a linear array, the second plurality of front panels disposed adjacent and spaced from the second wall, wherein each front panel of the first plurality of front panels and the second plurality of front panels has the multiple adjustable nozzles.

15. The HVAC system of claim 14, including an exhaust fluid outlet located at the perimeter of the clean room, wherein the exhaust fluid outlet is configured to exhaust the second fluid and the first fluid which is diluted with the second fluid.

16. A method for controlling a pattern of a flow of a fluid within a clean room, wherein the clean room comprises a clean area subject to contamination, comprising:
blowing a first fluid supply jet from a first fluid supply nozzle of multiple adjustable nozzles disposed on a front panel, the multiple adjustable nozzles enabling a flexible throw pattern adjustment of an air supply, the first fluid supply nozzle providing a first flow of the fluid towards a center of the clean area, wherein the multiple adjustable nozzles are each spaced from all vertical walls of the clean room;
blowing another first fluid supply jet from another first fluid supply nozzle of the multiple adjustable nozzles, the another first fluid supply nozzle providing another first flow of the fluid towards the center of the clean area; and
blowing a second fluid supply jet from a second fluid supply nozzle of the multiple adjustable nozzles to provide a second flow of the fluid towards a perimeter of the room and directing the second fluid supply jet along a ceiling of the clean room;
wherein the first fluid supply jet and the another first fluid supply jet are directed along the ceiling of the clean room and towards one another;
wherein a momentum of the first fluid supply jet and a momentum of the second fluid supply jet are adjusted so that the center of the clean area is flushed by the first flow and penetration of the second flow into the center of the clean area is prevented wherein the vertical walls include first and second vertical walls in opposing relation to one another, and third and fourth vertical walls in opposing relation to one another, wherein the first fluid supply nozzle is configured to provide the first fluid supply jet to provide the first flow of the fluid in a direction away from the first wall and toward the second wall, and the another first fluid supply nozzle is configured to provide the another first fluid supply jet to provide the another first flow of the fluid in a direction away from the second wall and toward the first wall such that the first flow and the another first flow collide at the center of the room, wherein the second fluid supply nozzle is configured to provide the second fluid supply jet to provide the second flow of the fluid in an opposite direction of the first flow and toward the first wall to collide with the first wall such that the first and second flows collide with one another adjacent a floor of the clean room and at a position directly underneath the first and second fluid supply nozzles, wherein the multiple adjustable nozzles include another second fluid nozzle configured to provide another second fluid supply jet to provide another second flow of the fluid in an opposite direction of the another first flow and toward the second wall to collide with the second wall such that the another first and second flows collide with one another adjacent the floor and at a position directly underneath the another first and second fluid supply nozzles, wherein the front panel includes:
  a first plurality of front panels arranged in a linear array, the first plurality of front panels disposed adjacent and spaced from the first wall; and
  a second plurality of front panels arranged in a linear array, the second plurality of front panels disposed adjacent and spaced from the second wall, wherein each front panel of the first plurality of front panels and the second plurality of front panels has the multiple adjustable nozzles.

17. The method of claim 16, further comprising blowing a third fluid supply jet which is configured between the first jet and the second jet.

* * * * *